United States Patent [19]

Klein

[11] Patent Number: 4,505,823
[45] Date of Patent: Mar. 19, 1985

[54] FILTERING DEVICE FOR TREATING CONTAMINATED AQUEOUS SOLUTIONS

[76] Inventor: Max Klein, P. O. Box 3, Dalton, Mass. 01226

[21] Appl. No.: 494,701

[22] Filed: May 16, 1983

[51] Int. Cl.³ .......................................... B01D 39/16
[52] U.S. Cl. .................................. 210/668; 210/679; 210/692; 210/694; 210/496; 210/502.1; 210/505; 53/429; 206/484; 206/525
[58] Field of Search ............... 210/679, 692, 694, 501, 210/503–509, 496, 282, 502.1, 668, 669, 767, 799, 483, 484, 488, 497.2, 497.3; 428/240, 244; 53/429, 431, 440; 206/484, 525

[56] References Cited

U.S. PATENT DOCUMENTS

| | | | |
|---|---|---|---|
| 3,003,643 | 10/1961 | Thomas | 210/503 |
| 3,327,859 | 6/1967 | Pall | 210/503 |
| 4,094,779 | 6/1978 | Behrman | 210/282 |
| 4,107,046 | 8/1978 | Corder | 210/282 |
| 4,115,261 | 9/1978 | Corte et al. | 210/40 |
| 4,207,378 | 6/1980 | Klein | 428/407 |
| 4,395,332 | 7/1983 | Klein | 210/496 |

FOREIGN PATENT DOCUMENTS

1301101 12/1972 United Kingdom.

Primary Examiner—Ivars Cintins
Attorney, Agent, or Firm—Dann, Dorfman, Herrell & Skillman

[57] ABSTRACT

Filter element package, method for preparing and method of using the same for treating contaminated aqueous solutions, in which the filter element is in the form of a mat consisting essentially of a wet laid, porous, non-woven matrix having randomly arranged, irregularly intersecting and overlapping cellulose fibers intermixed with polymer micro-bits. The filter mat, either alone or confronted with a supporting sheet of material, is provided in a predetermined geometrical shape and folded along perpendicular lines to form a four-layered filter element which can be displaced into a cone-shaped structure for filtering contaminated aqueous solutions. A resealable envelope is provided for enclosing the filter element and may include therein a bracing member to provide lateral support for the filter element during filtering and/or a collapsible receptacle for containing a predetermined quantity of the solution to be treated along with a packet of disinfectant for disinfecting the same.

30 Claims, 12 Drawing Figures

FILTERING DEVICE FOR TREATING CONTAMINATED AQUEOUS SOLUTIONS

FIELD OF THE INVENTION

The present invention relates generally to a filter element package for use in the treatment of contaminated aqueous solutions, particularly drinking water, and to the methods of preparing and using the filter element package.

BACKGROUND OF THE INVENTION

Surveys have indicated that a significant percentage of water obtained from individual taps in the home contains one or more bacterialogical or chemical constituents that exceed limits set forth in standards issued by public health services. The problem may be more acute in rural areas where water used for drinking and cooking is taken from natural sources and is used without any treatment. In some cases, such samples evidence a potential danger to public health, and in other cases adversely affect the potability of the water.

A multitude of contaminants have also been identified in various drinking water supplies in the United States. In particular, according to a recent report on water detoxification, more than 700 specific organic chemicals have been isolated from U.S. water supplies. These contaminants result for such diverse sources as industrial and municipal discharges, urban and rural runoff, and natural decomposition of vegetative and animal matter, as well as from water and sewage chlorination practices. Concentrations of contaminants vary from virtually nil in protected ground water to substantial levels in many surface waters and contaminated ground waters.

Organic chemical contaminants in drinking water can be divided into two major classes: those of natural origin and those of synthetic origin. The natural substances represent by far the greatest portion and consist primarily of undefined humus and fulvic materials and other substances produced by normal organic decomposition or biotic transformation and, in general, are not known to be harmful in themselves. These natural substances do, however, give rise to the undesirable odor and color which render drinking water non-potable or distasteful.

The synthetic chemicals in water can be subdivided into two groups. The first group consists of those chemicals that result from water treatment practices (e.g., chlorine and chloramine treatment), which treatment gives rise to trihalomethanes. Recent EPA studies indicate that, except for certain cases, trihalomethanes constitute the largest portion of the identifiable synthetic chemicals present in drinking water. Unlike other synthetic chemicals present in water supplies, chloroform and other trihalomethanes are formed during the treatment process. They are thus found in virtually every drinking water supply that is disinfected with chlorine, and not uncommonly at concentrations of several hundred parts per billion. Other studies indicate that trihalomethanes may represent only a portion of the total halogenated products resulting from chlorination of water. Halogenated organics such as carbon tetrachloride, and hexachloroethane have also been detected in parts per million levels as contaminants in chlorine supplies used in various water treatment processes.

When the water treatment occurs in a permanently installed water treatment system, prolonged storage, mechanical filtration and sedimentation may reduce the concentration of contaminants. However, the problem of contaminant removal is severe in temporary or portable treatment systems which are used at remote construction sites and by the armed forces on field maneuvers.

The second group of synthetic chemicals consists of those chemicals introduced into water supplies as a result of point and non-point sources of pollution. Nationally, both surface waters and to a lesser degree ground waters are contaminated with a variety of these pollution-related synthetic organic chemicals ranging from the low molecular weight halogenated hydrocarbons and monocyclic aromatic compounds to higher molecular weight pesticides, polycyclic aromatic compounds, and pesticide-like compounds.

The chemicals thus far identified in drinking water account for only a small fraction of the total organic content. Hence, the possibility, and indeed the probability, exists that additional substances of equal or greater toxicological significance may be present in water supplies.

The problem of contaminated water supplies has stimulated an abundance of research and development for treatment techniques for controlling the levels of contaminants in drinking water as well as for removing undesirable and aesthetically displeasing odor, and color therefrom. Public awareness of the problem has spawned several solutions of varying effectiveness.

One answer has been a steadily increasing usage of sterilized water or bottled water. At the same time, there have been a number of entries into the marketplace of point-of-use purification devices. The latter have included in-line filters, under-the-sink filters, free-standing drink-size separate filter units and filter devices that attach to the conventional sink faucet or to the typical aerator secured thereto.

In general, a somewhat limited number of processes have been found to be capable of removing undesired materials from water. These include reverse osmosis, freezing, filtration, chemical oxidation, distillation, adsorption on powdered charcoal and adsorption on granular activated carbon. Carbon filtration has been found to be particularly effective in removing some detergents, insecticides, viruses, specific chemical pollutants and taste and odor pollutants. For example, carbon has long been used for the removal of chlorine from water in the brewing and soft drink manufacturing industries. Activated carbon removes tastes and odors from water by an adsorption process in which substances of one kind are accumulated on the surfaces of another. The activated carbon has extremely large surface areas that make it efficient. The activation process produces pores that contribute substantially to increased surface area of treatment. In some cases, the activated carbon has been treated with oligodynamic silver which acts as a bactericide and self-sanitizing agent.

Filtered water for drinking or cooking is available in bottles and other containers, but for effective filtration with conventional equipment, it is necessary to provide mechanical filters which generate a sufficient head or pressure differential across the filter medium to assure an economic rate of flow through the filter medium. Such equipment is expensive and space-consuming and operation thereof for an entire water system is not practical.

It is evident that a continuing need exists for improved systems to control the levels of contaminants present in drinking water, both harmful contaminants such as trihalomethanes and aesthetically undesirable constituents which render the water non-potable.

SUMMARY OF THE INVENTION

In accordance with the present invention, there is provided a filter element with sub-micron porosity, high filtration rate and adsorption capability for removal of trace amounts of most dissolved organic contaminants in aqueous systems, especially halogens and halogenated organic contaminants, as well as undesirable constituents which render drinking water non-potable. The filter element package is a low-cost, compact, portable and reuseable liquid filtration medium with good tensile, tear and folding strength and, is unique in filtration medium design by virture of its combination of high particulate loading, low porosity and high filtration rate and, in addition, obviates the need for special mechanical filters or equipment.

In one aspect of the invention, a filter element is provided for use in the treatment of contaminated aqueous solutions. The reusable filter element comprises a filter mat which consists essentially of a wet laid, porous, non-woven matrix having randomly arranged irregularly intersecting and overlapping cellulose fibers. The fibers are intermixed with polymer micro-bits, which bits are produced from an expanded, non-brittle thermoplastic polymer or polymers selected from the group of styrene-polymer, polyolefins having from 2 to 6 carbon atoms, or flexible foamed polyurethane. The polymer micro-bits are substantially free of intact cells of the expanded polymer from which they were produced. The amount of said micro-bits present in the mat must be sufficient to provide the mat with a degree of porosity and flow-rate level required for filtering the contaminated aqeuous solution. The mix should also contain fibers of fiber-forming polyethylene terephthalate and/or at least one absorbing agent selected from the group of finely divided activated carbon, diatomaceous earth, and colloidal alumina monohydrate.

The filter mat is provided in a predetermined geometrical shape, typically substantially circular, and is folded along perpendicular lines to define a four-layered filter element, each layer of which is defined between a pair of fold lines forming a right-angle apex, in which fold lines the structural integrity of the mat is intact. The fold lines exhibit a memory tending to return the mat to its four-layered configuration which facilitates reuse of the filter element. One layer of the folded filter element is separated from the remaining three-layers to form a cone-shaped structure. The cone-shaped structure is placed in a filter support, such as a funnel, and the filter support is in turn placed in a receiving vessel with its discharge opening communicating with the vessel to enable capture and retention of the treated aqueous solution. The contaminated solution is filtered by pouring it through the cone-shaped filter element into the vessel to remove contaminants therefrom. Filtration of the contaminated solution is achieved by gravity flow without the need for mechanical devices used to generate a sufficient head or pressure differential. After use, the filter element is readily regenerated for reuse.

Aside from its use in the home in filtering out undesirable by-products of water treatment processes such as chlorine and trihalomethanes, the filter element of the present invention is particularly useful in field situations where the water has not been treated at all or is suspected of containing harmful or undesirable contaminants therein.

In another aspect of the invention, the folded filter element is enclosed in a resealable envelope, and, as such, presents a convenient, portable and compact means for treating contaminated aqueous solutions, both at home and in the field. The package may also include therein a pliant, form-retaining, self-sustaining impermeable sheet of material in confrontation with the filter element to obviate the need for a filter support, such as a funnel, in using the above-described filter element. This is of advantage to those intending to use the package in the field since conventional rigid filter supports are cumbersome and bulky. In conjunction with the filter element and support sheet of material, the package may include a bracing member which is operable to provide a lateral support for the filter element during treatment of contaminated aqueous solutions. Finally, the package may include a collapsible receptacle for containing a predetermined of the contaminated aqueous solution to be treated and a packet of disinfectant for disinfecting the same prior to filtration.

BRIEF DESCRIPTION OF THE DRAWINGS

The foregoing summary as well as the following detailed description of the preferred embodiment of the present invention will be better understood when read in conjunction with the accompanying drawings, in which.

DETAILED DESCRIPTION OF THE INVENTION

In accordance with the present invention, it has been discovered that it is possible to provide a simple inexpensive portable gravity flow device which is fully effective in the treatment of contaminated aqueous solutions.

In the illustrated embodiments of the present invention, the device is arrayed in a package which includes the components necessary for effectively removing the contaminants from an aqueous solution.

Figure 1:
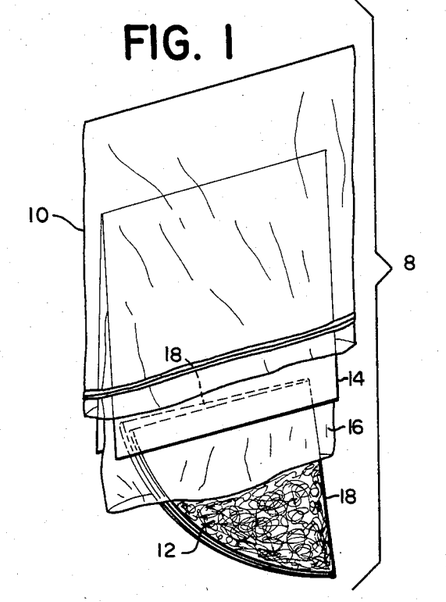
FIG. 1 is a perspective view of the filter element package showing the components partially removed therefrom.

FIG. 1 shows a filter element package 8 comprising a resealable envelope 10 enclosing a folded filter mat defining a filter element 12. The filter mat itself consists essentially of a wet laid, porous non-woven matrix having randomly arranged, irregularly intersecting and overlapping cellulose fibers. These fibers are intermixed with polymer micro-bits of an expanded, non-brittle, thermoplastic polymer selected from the group of a styrene-polymer, a polyolefin having from 2 to 6 carbon atoms, or copolymers or blends thereof, or micro-bits of a flexible foamed polyurethane. The polymer micro-bits are substantially free of intact cells of the expanded polymer from which they were produced. The amount of micro-bits present in the mat must be sufficient to provide the mat with the degree of porosity and flow-rate level required for filtering the contaminated aqueous solution. The mix should also include at least one of the following: fibers of a fiber-forming polyethylene terephthalate; and an adsorbing agent selected from the group consisting of finely divided activated carbon, diatomaceous earth, and collodial alumina monohydrate, or mixtures thereof. Additional details of the procedures for preparing a filter mat useful in the present invention are set forth in my pending U.S. application Ser. No. 258,443, now U.S. Pat. No. 4,395,322 the disclosure of which is incorporated herein by reference.

The above-described mat has a porosity effective to retain from liquids filtered through them finely divided particles of as low as 0.5 micron and less in size while at the same time providing maintained good gravity flow-through rates of the liquid being filtered. In addition, these mats are capable of adsorbing from liquid media (inert to the mat constitution) many substances dissolved or colloidally dispersed in such media even when present therein in a few parts per million or even in parts per billion, such as contaminants in rivers and streams or in drinking water.

The filter mat is of a predetermined geometrical shape, typically substantially circular, and is folded along perpendicular lines 18 to define the four-layered filter element 12, each layer of which is defined between a pair of fold lines, forming a right-angle apex. It has also been found that in order to preserve the structural integrity of the mat when it is folded into the four-layered filter configuration, the fold lines are preferably rendered sufficiently flexible to prevent cracking or rupturing of the filter mat. A simple and expedient way to accomplish this is by wetting the mat along the perpendicular lines and folding along these lines to form the four-layered filter element. The wetting prior to folding also enables the fold lines of the mat to exhibit a memory tending to return the mat to its four-layered configuration after its intended use, that is, after the filtering of contaminated aqueous solutions such as contaminated drinking water.

In a preferred embodiment, as illustrated in FIG. 1, the filter element package includes a folded sheet of a cardboard-type material 14 with a description of the package on the front side of the cardboard and specific instructions for using the package on the reverse side. The filter mat package as shown in FIG. 1 also includes a separate cellophane-type protective wrap 16 enclosing the filter element to protect against contamination during normal handling. After its intended use, the filter element is preferably replaced in its cellophane-type protective wrap and inserted into the folded cardboard-type material before it is returned for storage in the resealable envelope. This not only prevents against undesirable contamination but also protects the filter element from any physical or structural damage which may occur between uses.

Figures 4, 6:
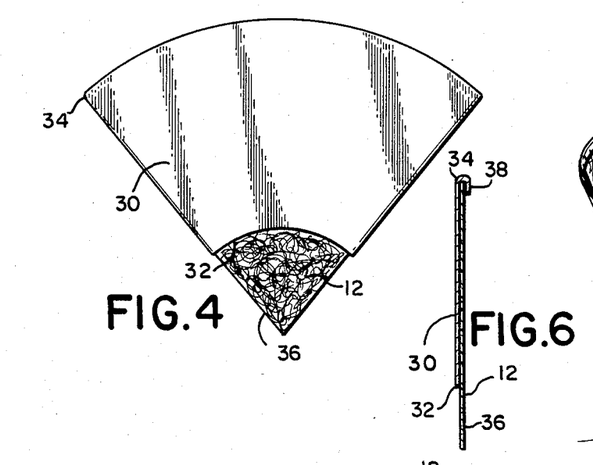
FIG. 4 is an elevational view of a second embodiment of the filter element including a pliant, form-retaining, self-sustaining, and impermeable sheet of material in confrontation with said filter mat.
FIG. 6 is a sectional view of the filter mat and sheet of material taken on line 6—6 of FIG. 5.

According to another embodiment of the present invention, as illustrated in FIGS. 4–9, the filter element of the filter element package when displaced into conical form is confronted on one surface with a pliant, form-retaining, self-sustaining and impermeable sheet of material 30. The sheet of material is used to support the filter element and obviates the need for an independent filter support when using the filter element package to treat contaminated aqueous solutions as discussed below. Materials such as heavy-duty aluminum foil, flexible plastics, or the like are suitable as a supporting sheet. All that is necessary in selecting the sheet of material is that it be capable of supporting the filter element when it is in its open configuration for filtering. As best illustrated in FIG. 4, the sheet of material confronting the packaged filter mat is annular with an inner perimeter providing an opening 32 and an outer perimeter 34 which is larger than the opening. The opening 32 is in registry with the right-angle apex 36 of the folded mat so that the filter element comprising the folded mat and support material may be removed from the envelope and displaced into conical form to enable treatment of the contaminated solution by the desired flow through the mat and opening.

Figure 5:
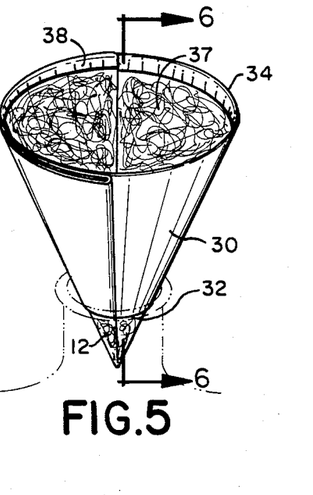
FIG. 5 is a perspective view of the filter mat and sheet of material in condition for its intended use.

In one aspect of this embodiment, as best illustrated in FIGS. 5 and 6, the sheet of material is partially coextensive with the geometrically-shaped mat and is folded along with the mat to form the four-layered filter element with each layer of the four-layered element confronted on one side with the sheet of material. The sheet of material is necessarily partially coextensive since the sheet of material confronting the mat must, when folded to form the four-layered filter element be annular with an inner perimeter providing the above-described opening 36 through which the contaminated aqueous solution passes during filtering. In addition, when the mat in confrontation with the sheet of material is folded to define the four-layer filter element, separating one layer from the rest in effect provides a cone-shaped structure with an inner surface 37 comprising the above-described filter mat material and an outer surface comprising the supporting sheet of material 30 as best illustrated in FIG. 5. The circumference of the supporting sheet of material is larger than the circumference of the filter mat in its predetermined geometrical shape and may be folded over the circumference of the mat as illustrated in FIG. 5 to retain the mat and sheet of material in its confronting relationship when folded to form the four-layered filter element. As best illustrated in FIG. 5, the support material which is folded over the filter mat is scored to prevent crinkling when folded.

The filter mat and sheet of material may be derived from a two-layered stock material. The outer perimeter of the support material is preferably larger than the outer perimeter of the mat to enable folding over as described above. The above-described aspect of this embodiment does not interfere with the flow-through rate of the filter element since the impermeable support sheet of material is not bonded to the filter mat and therefore permits flow between the mat and support material.

Figure 7:
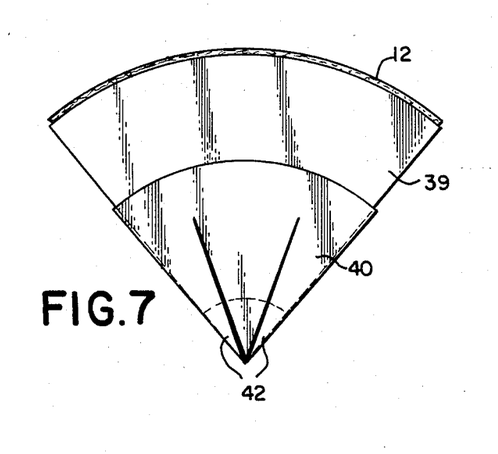
FIG. 7 is an elevational view of a third embodiment of the filter element having both a sheet of material confronting said mat and a bracing member associated therewith.
Figure 8:
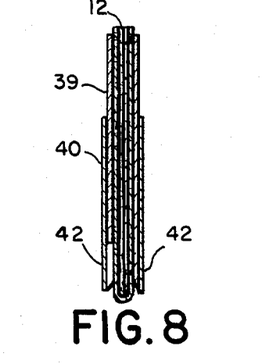
FIG. 8 is a transverse sectional of embodiment of FIG. 7.
Figure 9:
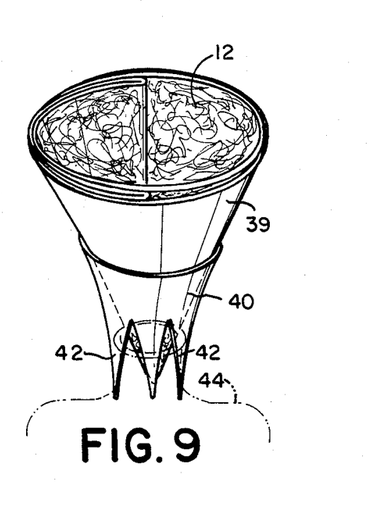
FIG. 9 is a perspective view showing the use of the embodiment of FIG. 7.

In another aspect of this embodiment, as best illustrated in FIGS. 7-9, the supporting sheet of material 39 only partially confronts the above-described filter element in that only the outer surface of the folded four-layered filter mat displaced into conical form is in a confronting relationship with the supporting material 39. In this embodiment the support 39 is in the form of a conical cup with its apex cut away.

The filter element of the above-described embodiments comprising the folded mat and support material may also have a bracing member 40 associated therewith which is operable when the filter element is displaced into its conical form as best illustrated in FIG. 9. The bracing member 40 provides lateral support for the filter element when treatment of a contaminated aqeuous solution using the filter element package is to be carried out without the use of a filter support, such as a funnel. Bracing member 40 is composed of a material similar in nature to the supporting sheet 39 and disposed on the outer surface of the supporting sheet as illustrated in FIGS. 7 and 9 and includes finger means 42 projecting downwardly past the lower edge of the support 39. The fingers 42 are adapted to engage a vessel 44 receiving the treated contaminated aqueous solution.

Figure 10:
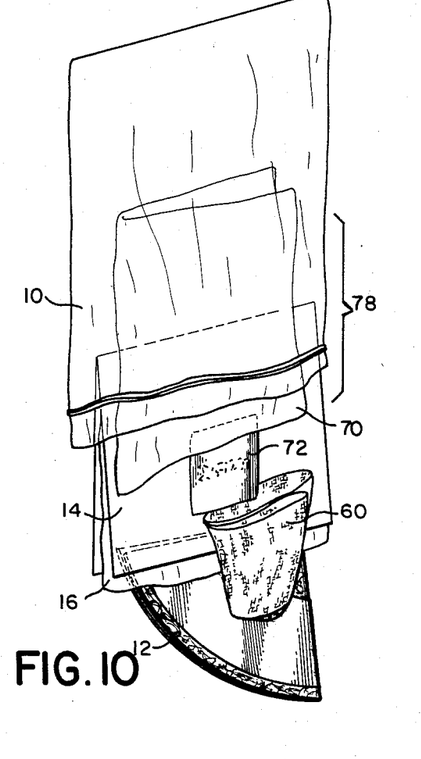
FIG. 10 is a perspective view of a second embodiment of the filter element package including a collapsible receptacle, a packet of disinfectant and a support sleeve for supporting the filter element.
Figure 11:
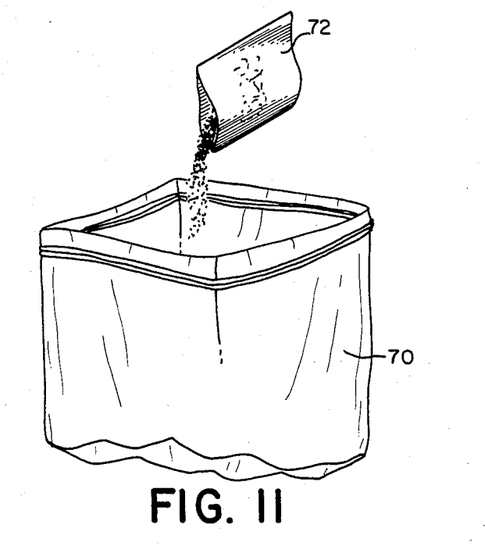
FIG. 11 is a perspective view of the collapsible receptacle in condition for its intended use showing the use of the packet of disinfectant.
Figure 12:
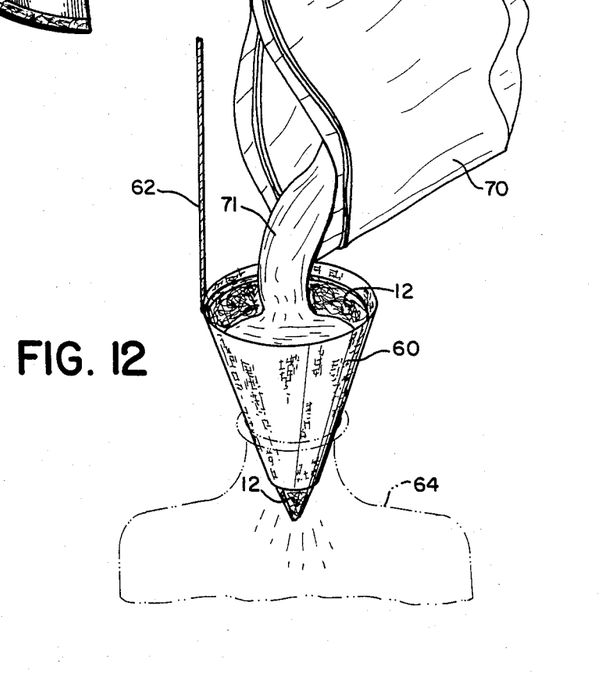
FIG. 12 is a perspective view showing the use of the collapsible receptacle in conjunction with the support sleeve.

In yet another embodiment of the present invention, as illustrated in FIGS. 10-12, the filter element package 78 includes a collapsible receptacle 70 for containing a predetermined quantity of the contaminated solution 71 to be treated and a packet of disinfectant 72. The packet contains the optimum amount of disinfectant to properly treat said predetermined quantity of contaminated solution. In practicing this embodiment of the invention, the predetermined amount of drinking water suspected of containing harmful bacteria is added to the receptacle 70, typically a self-closing or self-sealing plastic bag, as best illustrated in FIGS. 10-12, and the proper quantity of disinfectant in the packet 72, such as chlorine or chlorine-dioxide producing compounds is added to disinfect the water. In the modification illustrated in FIG. 12, the bracing member which serves the function of the member 40 described above, comprises a fabric sleeve 60, which sleeve has a suspension member 62 associated therewith. This ensemble is used to filter drinking water from outdoor supplies such as streams, ponds, rivers, etc. The suspension member 62 is tied to a limb of a tree or other convenient means. The filter element supported by the impermeable sheet of material in its cone-shaped form is placed in sleeve 60. The contaminated water is poured into the open filter element supported by sleeve 60 and the resulting treated water is collected in receptical 64 as shown in FIG. 12, to remove residual disinfectant, resulting reaction products and other contaminants and yield uncontaminated potable drinking water.

In accordance with the present invention, the above-described filter element package is simply and inexpensively prepared. No special machinery or equipment is necessary for preparation of the package. After forming the mat into its predetermined geometrical shape, the mat is wetted at least along perpendicular lines 18 and folded along these lines to define the four-layered filter element 12, in which fold lines, as mentioned above, the structural integrity of the mat is intact. The folded structure is then dried whereby fold lines 18 exhibit a memory tending to return the mat to its folded four-layered configuration. Drying additionally prevents the growth of undesirable bacteria on the wetted portions of the element since all moist carbon-containing filter materials have a tendency to promote bacterial growth at room temperature. The drying step comprises subjecting the folded mat to temperatures below the degradation temperature of the mat but above the boiling point of the solution used to wet the mat along the perpendicular lines. Finally, the mat is enclosed in resealable envelope 10, as best illustrated in FIG. 1.

Figure 2:
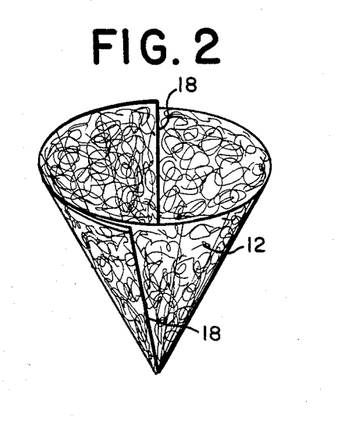
FIG. 2 is a perspective view of the folded filter mat in condition for its intended use.
Figure 3:
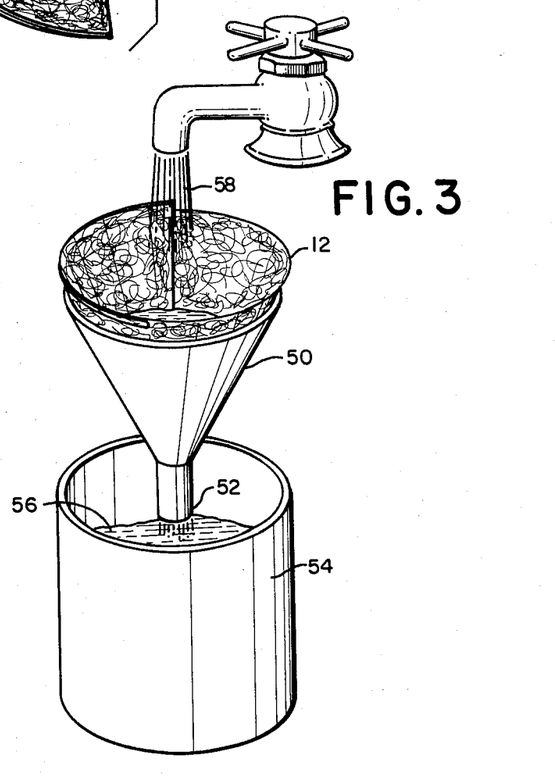
FIG. 3 is a perspective view showing the use of the folded filter in treating tap water.

In accordance with the present invention, there is also provided a simplified method for using the above-described filter element in the treatment of various contaminated aqueous solutions. The method comprises providing the above-described filter element. One layer of the element is separated from the remaining three to form a cone-shaped structure as best illustrated in FIGS. 2 and 3. As illustrated in FIG. 3, the cone-shaped structure is then placed in the filter support 50 which supports the cone-shaped filter element. The filter support has a central opening 52 proximate the right-angle apex of the filter element such that the filter support supporting the cone-shaped filter element may be placed in a receiving vessel 54 with the filter supports opening communicating with the vessel to enable containment of a treated aqueous solution 56. Once in place, the contaminated solution 58 may be filtered by pouring it through the cone-shaped filter element and opening of the filter support whereby a substantially contaminant-free solution is received into the vessel 54. A preferred embodiment of the method of using the filter mat package includes the additional step of wetting the filter element prior to filtering the contaminated solution in order to facilitate gravity flow of the solution through the element. The element is preferably wetted by pouring some of the solution to be treated into the interior of the element so as not to contaminate the exterior.

After treatment of the contaminated solution the filter element may be prepared for reuse by removing the element from the filter support and vessel, drying the filter element at a temperature below the degradation temperature of the mat but above the boiling point of the solution being treated, resealing the folded filter element in its resealable envelope, and storing the package at a reduced temperature to inhibit bacterial growth on said element in the event of incomplete drying. When the contaminated solution is drinking water, as illustrated in FIG. 3, the filter element may be prepared for reuse by placing it on a sheet of aluminum paper and drying it in an oven at approximately 275° F. for one hour. In addition to preparing the filter element for reuse, it has been found that drying the filter mat in an oven at about 275° F. for one hour substantially completely regenerates the activated carbon component of the mat. More specifically, it has been found that subjecting the filter mat to the above-described drying step regenerates about 80-90% of the activated carbon. Before resealing the dried element in its resealable envelope any particulate material which may have become lodged within the filter element should be dumped out.

Using the filter mat package according to the present invention will remove a variety of contaminants from drinking water. Filtering drinking water through the filter element removes sediment, asbestos and coliforms. The filter element also filters out, to acceptable levels, any halogens or halogen-containing compounds, such as chlorine, or halogenated organic compounds, i.e. trihalomethanes (chloroform), chloramine, and PCBs. Other toxic organic substances such as benzene, phenol, toluene and benzaldehyde, or mixtures thereof or polynuclear aromatic hydrocarbons will also be substantially completely removed.

The following examples illustrate field applications using the filter element package of the present invention in the treatment of contaminated well water. The examples further describe the manner of using the invention and set forth the best mode contemplated for carrying out the invention, but is not to be construed as limiting the invention.

EXAMPLE 1

The four-layered filter element was removed from its resealable envelope and was thoroughly wet with tap water by opening the element and pouring the water into the interior. In its open conical form the element had a diameter of about 6 inches. The filter element was fit into a quart size filter funnel and the funnel was placed in a receiver container. Well water in the test area was contaminated with 1,2 Dichloropropane (1,2 D).

1,2 D is an insecticide used in the treatment of nematode infestation and has been reported by the EPA as a suspected carcinogen. The maximum allowable limit set for this contaminant is 10 parts per billion (ppb). Raw well water was tested for 1,2 D concentrations. The test sensitivity was 0.5 ppb. Sample 1 contained 12 ppb 1,2 D. Sample 2 contained 13 ppb 1,2 D. 3000 ml of the test water from sample 1 was initially passed through the filter with the volume of contaminated water in the filter being maintained approximately ½" from the top to maintain a maximum flow of about 0.1 gallons per minute. Duplicate samples were collected from the next 500 ml of water to pass through the filter. The amount of contaminant present in the treated sample 1 was non-detectable. Sample 2 was filtered as per sample 1, and again, the amount of 1,2 D present in treated sample 2 was non-detectable.

EXAMPLE 2

10,000 ml of contaminated water from each of samples 1 and 2 were passed through a fresh filter as per Example 1 to maintain a maximum flow rate of about 0.1 gallons per minute and the next 500 ml of each sample of filtered was used to collect duplicate samples. The concentration of 1,2 D in each of the treated samples was non-detectable.

The effectiveness of the filter element package of the present invention was tested against filtration of the contaminated well water of Examples 1 and 2 using a Whatman No. 40 paper filter. The Whatman filter paper was placed in a clean glass funnel. 500 mls of contaminated well water from sample 1 and 500 ml from sample 2 were initially passed through the Whatman filter and the next 500 mls from each sample of filtered water was used to take duplicate samples. Treated water from sample 1 contained 8.0 ppb 1,2 D. Treated water from sample 2 contained 12.0 ppb 1,2 D.

These tests indicate that the filter element package of the present invention is effective in removing extremely low levels of 1,2 D from contaminated well water.

In these and other cases, the filter element package of the present invention may be used and reused to effectively remove extremely low levels of contaminants present in water.

As mentioned above, the filter mat package may include an impermeable sheet of material and a bracing member or knitted sleeve in conjunction with the impermeable sheet of material to support the filter element when used in the field to filter contaminated water from rivers, streams or ponds. In addition, the filter element package may also include a collapsible receptacle for measuring and containing a predetermined volume of water to be treated and a packet of disinfectant in the optimum amount to decontaminate said volume of water prior to filtering.

The collapsible receptacle and packet of disinfectant is useful in field situations and also in rural areas where water used for cooking and drinking is taken from natural sources and is used without any treatment.

Finally, the filter element package may be used to filter treated tap water to remove chlorine and other aesthetically undesirable or distasteful by-products of water treatment processes.

I claim:

1. A filter element package for use in the treatment of a contaminated aqueous solution which comprises:
    (a) a filter element comprising a filter mat consisting essentially of a wet laid, porous, non-woven matrix having randomly arranged, irregularly intersecting and overlapping cellulose fibers, said fibers intermixed with polymer micro-bits of an expanded, non-brittle thermoplastic polymer selected from the group of a styrene-polymer, a polyolefin having from 2 to 6 carbon atoms, or copolymers or blends thereof, or micro-bits of a flexible foamed polyurethane, said polymer micro-bits being substantially free of intact cells of the expanded polymer from which they were produced, the amount of said micro-bits present in said mat being sufficient to provide the mat with the degree of porosity and flow-rate level required for filtering said contaminated aqueous solution, and which mix includes at least one of the following:
        (i) fibers of a fiber-forming polyethylene terephthalate; and
        (ii) an adsorbing agent selected from the group consisting of finely divided activated carbon, diatomaceous earth, and colloidal alumina monohydrate;
    said filter mat provided in a predetermined geometrical shape and folded along perpendicular lines to define a four-layered filter element, each layer of which is defined between a pair of fold lines, forming a right-angle apex, in which fold lines the structural integrity of said mat is intact, said fold lines exhibiting a memory tending to return said mat to said folded four-layered configuration; and
    (b) a reasealable envelope enclosing said four layered filter element.

2. A filter element package as defined in claim 1, wherein said filter element is confronted on its exterior surface with a pliant, form-retaining, self-sustaining and impermeable sheet of material for supporting said filter element, said sheet of material being annular with an inner perimeter providing an opening, and an outer perimeter which is larger than said opening, said opening being in registry with said right-angle apex of said folded four-layered filter element, so that said filter element may be removed from said package and displaced into conical form, said supporting sheet being similarly displaced into conical form to provide a funnel support for supporting said filter element and enabling treatment of said solution by the desired flow through said filter element and opening.

3. A filter element package as defined in claim 2, wherein the outer perimeter of said sheet of impermeable material is larger than the outer perimeter of said filter element and is folded over said outer perimeter of filter element to retain said filter element and sheet in said confronting relationship.

4. A filter element package as defined in claim 2, wherein said sheet of material is partially coextensive with the mat of said filter element and confronts one side of each layer of said four-layered filter element.

5. A filter element package as defined in claim 4, wherein said sheet of material comprises aluminum foil, which foil has an outer perimeter which is larger than the outer perimeter of said filter mat and is folded over said outer perimeter of said mat and against the opposite surface of said mat to retain said mat and foil in a confronting relationship when folded to form said filter element.

6. A filter element package as defined in claim 2 including a member disposed within said envelope and operable when removed from said envelope and said supporting sheet is in said conical form to provide lateral support for said sheet of material when filtering said contaminated aqueous solution into a receiving vessel.

7. A filter element package as defined in claim 6, wherein said member is disposed on the outer surface of said supporting sheet and includes finger means projecting downwardly past the lower end of said supporting sheet adapted when removal from said envelope to engage said receiving vessel.

8. A filter element package as defined in claim 6 wherein said member providing lateral support for said sheet of material is a knitted sleeve.

9. A filter element package as defined in claim 2, including a collapsible receptacle operable upon removal for said envelope to measure and contain a predetermined quantity of a contaminated aqueous solution to be treated, and a packet of disinfectant in the optimum amount to react with and disinfect said predetermined quantity of contaminated solution upon mixing said disinfectant and contaminated solution in said collapsible receptacle, said disinfectant and reaction product resulting from said mixture being of a character and composition to be separated from said aqueous solution by said filter mat.

10. A filter element package as defined in claim 1 wherein said filter mat's predetermined geometrical shape is substantially circular.

11. A filter element package as defined in claim 1, wherein the contents of said resealable envelope are sterile and said envelope is sealed against contamination of said contents.

12. A method for preparing a filter element package for use in the treatment of a contaminated aqueous solution which comprises:
(A) a filter element comprising a filter mat consisting essentially of a wet laid, porous, non-woven matrix having randomly arranged, irregularly intersecting and overlapping cellulose fibers, said fibers intermixed with polymer micro-bits of an expanded, non-brittle thermoplastic polymer selected from the group of a styrene-polymer, a polyolefin having from 2 to 6 carbon atoms, or copolymers or blends thereof, or micro-bits of a flexible foamed polyurethane, said polymer micro-bits being substantially free of intact cells of the expanded polymer from which they were produced, the amount of said micro-bits present in said mat being sufficient to provide the mat with the degree of porosity and flow-rate level required for filtering said contaminated aqueous solution, and which mix includes at least one of the following:
  (i) fibers of a fiber-forming polyethylene terephthalate; and
  (ii) an adsorbing agent selected from the group consisting of finely divided activated carbon, diatomaceous earth, and colloidal alumina monohydrate;
said filter mat provided in a predetermined geometrical shape and folded along perpendicular lines to define a four-layered filter element, each layer of which is defined between a pair of fold lines, forming a right-angle apex, in which fold lines the structural integrity of said mat is intact, said fold lines exhibiting a memory tending to return said mat to said folded four-layered configuration; and
(B) a reasealable envelope enclosing said four-layered filter element; which method comprises:
  (a) forming said filter mat into said predetermined geometrical shape;
  (b) wetting said geometrically-shaped filter mat with a wetting agent at least along said perpendicular lines;
  (c) folding said geometrically-shaped filter mat along said wetted perpendicular lines to form said four-layered filter element;
  (d) drying said filter element whereby said fold lines exhibit said memory; and
  (e) enclosing said dried filter element in said resealable envelope, and sealing the envelope.

13. The method as defined in claim 12, including the additional steps of confronting one surface of said geometrically-shaped mat with a pliant, form-retaining, self-sustaining and impermeable sheet of material, said sheet of material being annular with an inner perimeter providing an opening and an outer perimeter which is larger than both said inner perimeter and the outer perimeter of said geometrically-shaped mat, and folding said sheet of material over the outer perimeter of said geometrically-shaped mat prior to folding said geometrically-shaped mat to maintain said confronting relationship.

14. The method as defined in claim 12, wherein said drying step comprises drying said element at a temperature below the degradation temperature of said mat but above the boiling point of said wetting agent.

15. A method for using a filter element in the treatment of a contaminated aqueous solution which method comprises:
(a) providing a filter mat consisting essentially of a wet laid, porous, non-woven matrix having randomly arranged, irregularly intersecting and overlapping cellulose fibers, said fibers intermixed with polymer micro-bits of an expanded, non-brittle thermoplastic polymer selected from the group of a styrene-polymer, a polyolefin having from 2 to 6 carbon atoms, or copolymers or blends thereof, or micro-bits of a flexible foamed polyurethane, said polymer micro-bits being substantially free of intact cells of the expanded polymer from which they were produced, the amount of said micro-bits present in said mat being sufficient to provide the mat with the degree of porosity and flow-rate level required for filtering said contaminated aqueous solution, and which mix includes at least one of the following:

(i) fibers of a fiber-forming polyethylene terephthalate; and (ii) an adsorbing agent selected from the group consisting of finely divided activated carbon, diatomaceous earth, and colloidal alumina monohydrate;

said filter mat provided in a predetermined geometrical shape and folded along perpendicular lines to define a four-layered filter element, each layer of which is defined between a pair of fold lines, forming a right-angle apex, in which fold lines the structural integrity of said mat is intact, said fold lines exhibiting a memory tending to return said mat to said folded four-layered configuration; and (b) separating one layer of said folded filter element from the remaining three layers to form a cone-shaped structure;

(c) supporting said cone-shaped structure in a filter support having a central opening and placing said filter support with its opening communicating with a receiving vessel to enable containment of treated aqueous solution in said vessel; and (d) filtering of said contaminated solution by pouring said contaminated aqueous solution through said cone-shaped filter element and said opening into said vessel, to thereby remove said contaminant.

16. The method for using the filter element as defined in claim 15, including, prior to filtering said contaminated solution, the additional step of measuring a predetermined volume of said solution and adding to said volume a disinfectant in the optimum amount to disinfect said predetermined volume.

17. A method for using the filter element as defined in claim 15, including the additional step of wetting the filter element from the inside prior to filtering said contaminated solution.

18. A method for using a filter element as defined in claim 15, wherein said filter element is prepared for reuse, which method includes:

(a) removing said filter element from said filter support;

(b) drying said filter element in its folded four-layered configuration;

(c) sealing said folded filter element in a resealable envelope to form a package; and (d) storing said package at a reduced temperature to inhibit bacterial growth on said filter element.

19. A method for using the filter element as defined in claim 18, wherein said drying step comprises drying said filter element at a temperature below the degradation temperature of said mat but above the boiling point of said treated solution.

20. A method for using the filter element as defined in claim 18, wherein said drying is effected for a time period and at a temperature which are sufficient to substantially completely regenerate said adsorbing agent component of said mat.

21. The method of using the filter element as defined in claim 15, wherein said contaminated aqueous solution is water, and the filtered solution is potable water.

22. The method of using the filter element as defined in claim 21, wherein said contaminant is selected from the group of sediment, asbestos and coliform.

23. The method of using the filter element as defined in claim 21, wherein said contaminant is a halogen selected from the group of chlorine and bromine.

24. The method of using the filter element as defined in claim 21, wherein said contaminant is a toxic organic substance.

25. The method of using the filter element as defined in claim 24, wherein said toxic organic substance is selected from a group consisting of a halogenated organic compound, phenol, a mixture of aromatic organic compounds, and polynuclear aromatic hydrocarbon.

26. The method of using the filter element as defined in claim 25, wherein said halogenated organic compound is selected from a group of trihalomethane, chloramine and PCB.

27. The method of using the filter element as defined in claim 25, wherein said mixture of aromatic organic compounds consists of compounds selected from the group of benzene, toluene and benzaldehyde.

28. A two-layered filter element stock material for use in the treatment of a contaminated aqueous solution which comprises:

(a) a filter mat consisting essentially of a wet laid, porous, non-woven matrix having randomly arranged, irregularly intersecting and overlapping cellulose fibers, said fibers intermixed with polymer micro-bits of an expanded, non-brittle thermoplastic polymer selected from the group of a styrene-polymer, a polyolefin having from 2 to 6 carbon atoms, or copolymers or blends thereof, or micro-bits of a flexible foamed polyurethane, said polymer micro-bits being substantially free of intact cells of the expanded polymer from which they were produced, the amount of said micro-bits present in said mat being sufficient to provide the mat with the degree of porosity and flow-rate level required for its intended use, and which mix includes at least one of the following:

(i) fibers of a fiber-forming polyethylene terephthalate; and (ii) an adsorbing agent selected from the group consisting of finely divided activated carbon, diatomaceous earth, and colloidal alumina monohydrate; and (b) a pliant, form-retaining, self-sustaining and impermeable sheet of material in confrontation with one surface of said filter mat for supporting said filter mat.

29. The two-layered filter element stock material as defined in claim 28, wherein said filter mat and said sheet of material are attached together, the outer perimeter of said sheet material being larger than the outer perimeter of said mat, and said outer perimeter of said sheet of material being folded over said mat to capture said mat against displacement.

30. The two-layered filter element stock material as defined in claim 29, wherein said sheet of material comprises aluminum foil.

* * * * *